(12) United States Patent
Koskela et al.

(10) Patent No.: US 8,867,458 B2
(45) Date of Patent: Oct. 21, 2014

(54) NETWORK CONTROLLED DEVICE TO DEVICE / MACHINE TO MACHINE CLUSTER OPERATION

(75) Inventors: Timo Koskela, Oulu (FI); Tao Chen, Oulu (FI); Sami Hakola, Kempele (FI)

(73) Assignee: Nokia Corporation, Espoo (FI)

( * ) Notice: Subject to any disclaimer, the term of this patent is extended or adjusted under 35 U.S.C. 154(b) by 818 days.

(21) Appl. No.: 12/771,441

(22) Filed: Apr. 30, 2010

(65) Prior Publication Data

US 2011/0268006 A1   Nov. 3, 2011

(51) Int. Cl.
*H04W 4/00* (2009.01)
*H04W 72/12* (2009.01)
*H04W 72/00* (2009.01)
*H04W 76/02* (2009.01)
*H04W 4/08* (2009.01)

(52) U.S. Cl.
CPC .......... *H04W 72/121* (2013.01); *H04W 76/021* (2013.01); *H04W 76/023* (2013.01); *H04W 4/08* (2013.01)
USPC .......................................... 370/329; 455/450

(58) Field of Classification Search
None
See application file for complete search history.

(56) References Cited

U.S. PATENT DOCUMENTS

| | | | |
|---|---|---|---|
| 2005/0220042 A1* | 10/2005 | Chang et al. | 370/278 |
| 2005/0249164 A1* | 11/2005 | Kwak et al. | 370/335 |
| 2009/0016231 A1 | 1/2009 | Li et al. | |
| 2009/0239590 A1* | 9/2009 | Parkvall | 455/572 |
| 2010/0009675 A1 | 1/2010 | Wijting et al. | |
| 2010/0169498 A1 | 7/2010 | Palanki et al. | |
| 2010/0189046 A1* | 7/2010 | Baker et al. | 370/329 |
| 2010/0195585 A1* | 8/2010 | Horn et al. | 370/329 |
| 2011/0211447 A1* | 9/2011 | Wang et al. | 370/230 |
| 2011/0321050 A1* | 12/2011 | Ho et al. | 718/102 |
| 2012/0014287 A1* | 1/2012 | Kim et al. | 370/254 |
| 2012/0039288 A1* | 2/2012 | Kim et al. | 370/329 |
| 2012/0039289 A1* | 2/2012 | Kim et al. | 370/329 |

FOREIGN PATENT DOCUMENTS

WO     2010/035100 A1     4/2010

OTHER PUBLICATIONS

3GPP TS 36.212 V9.1.0 (Mar. 2010), Technical Specification, 3rd Generation Partnership Project; Technical Specification Group Radio Access Network; Evolved Universal Terrestrial Radio Access (E-UTRA); Multiplexing and Channel Coding (Release 9); 3GPP, Mar. 2010, pp. 1-61, Valbonne, France.

Klaus Doppler et al., "Device-to-Device Communications; Functional Prospects for LTE—Advanced Networks", Communications Workshops, 2009, ICC Workshops 2009. IEEE International Conference, Jun. 2009, pp. 1-6.

Timo Koskela et al., "Clustering Concept Using Device-to-Device Communication in Cellular System", Wireless Communications and Networking Conference, IEEE, Apr. 18-21, 2010, pp. 1-6.

(Continued)

*Primary Examiner* — Eunsook Choi
(74) *Attorney, Agent, or Firm* — Squire Patton Boggs (US) LLP

(57) ABSTRACT

Methods, apparatuses, and systems can permit network allocation of uplink resources. In one example, a method includes determining uplink resources to be granted to a cluster. The method can also include preparing, at an apparatus, an uplink resource grant, based on the determining, including a transmitter identifier. The method can further include transmitting the uplink resources grant to a plurality of cluster nodes of the cluster. The transmitter identifier identifies at least one node of the plurality of cluster nodes.

20 Claims, 8 Drawing Sheets

Example use case of group IDs in the device/machine cluster.

(56) References Cited

OTHER PUBLICATIONS

Jaakko Seppala et al., "Network Controlled Device-to-Device (D2D) and Cluster Multicast Concept for LTE and LTE-A Networks", Wireless Communications and Networking Conference . IEEE, Mar. 28-31, 2011, pp. 986-991.

International Search Report and Written Opinion International Application No. PCT/IB2011/051935 dated Aug. 2, 2011.

* cited by examiner

| Group ID | Bitfield | |
|---|---|---|
| 0 | 0 | 0 |
| 1 | 0 | 1 |
| 2 | 1 | 0 |
| 3 | 1 | 1 |

| Transmitting Device ID | Bitfield | | |
|---|---|---|---|
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |

Figure 1. Example configuration of group IDs and Transmitting Device ID with 5bits

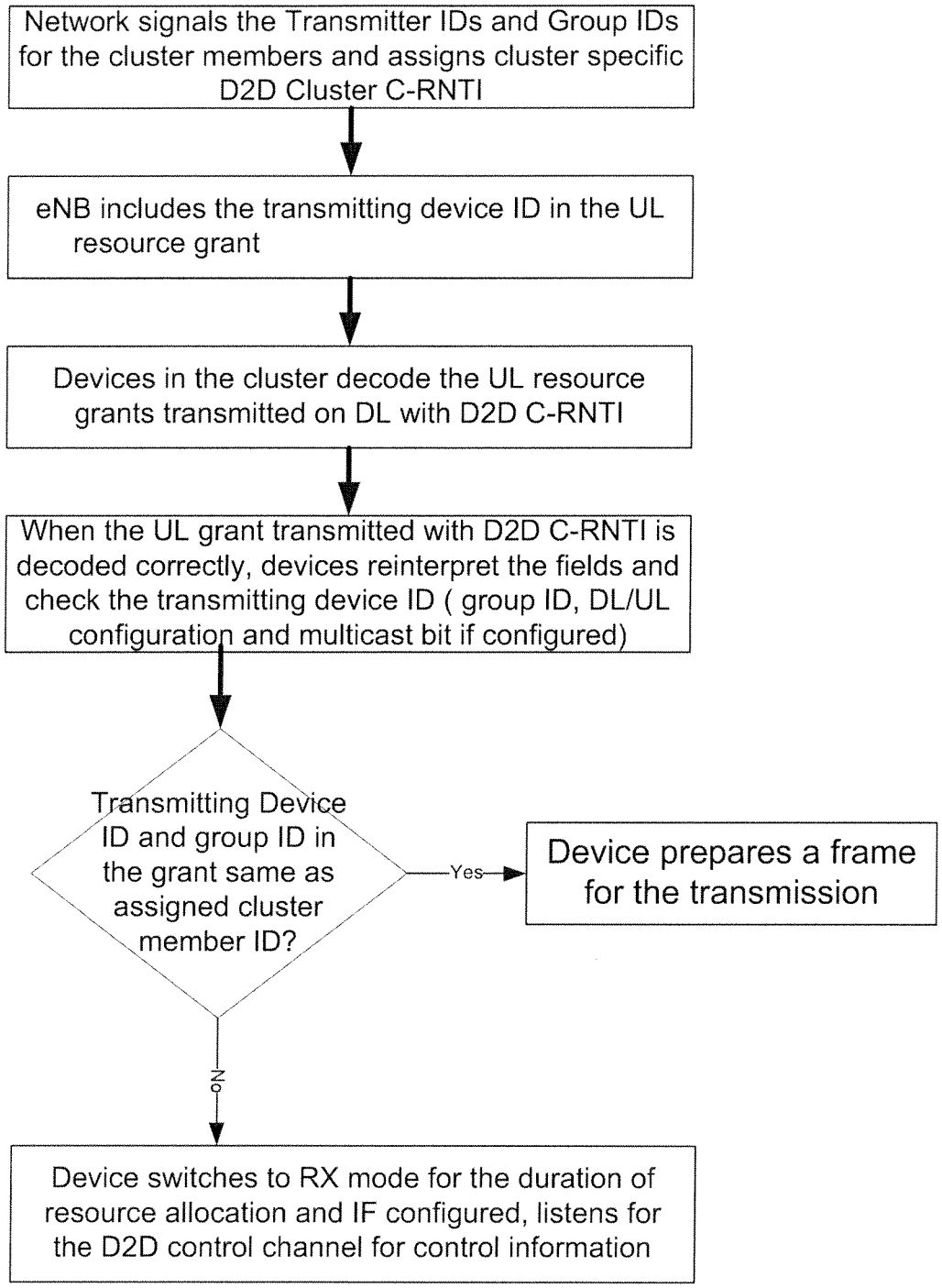
Figure 2. Cluster resource allocation and channel access procedure.

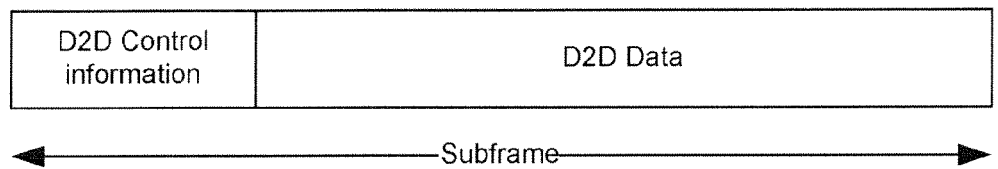
Figure 3. Dividing the allocated subframe between control part and data part

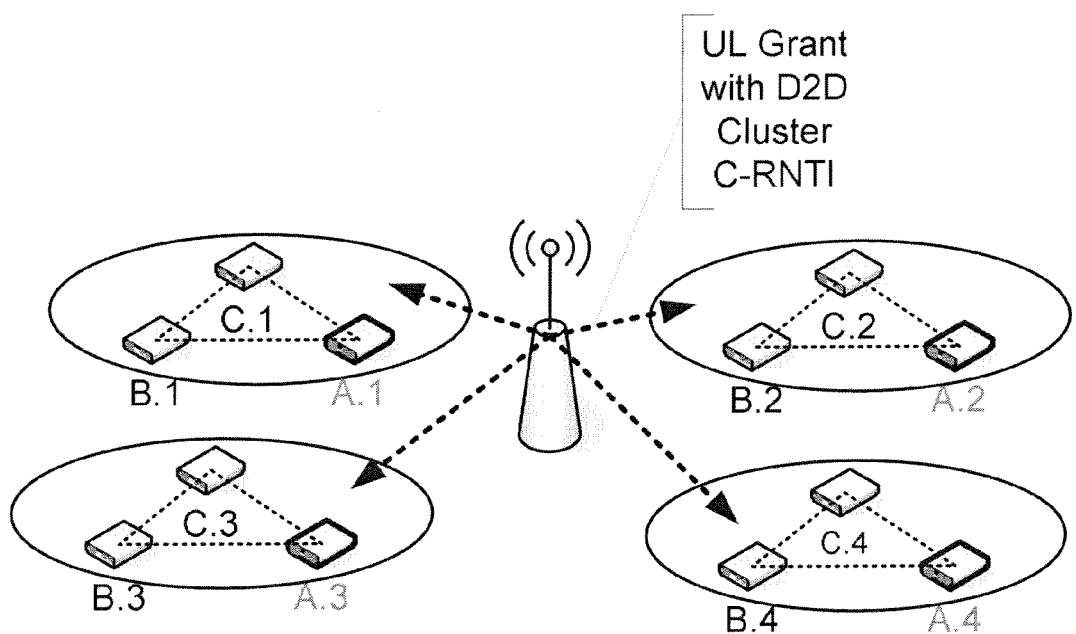
Figure 4. Example use case of group IDs in the device/machine cluster.

| Field | bits | | | | | comment |
|---|---|---|---|---|---|---|
| Flag for format0/format1A differentiation | 0 | | | | | 0 format 0 |
| Frequency hopping flag | 0 | | | | | 0 no hopping |
| Resourceblock assignment | 0 | 1 | 0 | 1 | 1 | 0 resource allocation |
| Group / TX ID | 0 | 0 | 1 | 1 | 1 | 1 group A == 00 TX ID == 1111 all transmit |
| TPC command for the scheduled PUSCH | | | | 0 | 0 | 0 power control command for the cluster |
| Cyclic shift for DM RS | | | 0 | 0 | 0 | 0 cyclic shift |
| UL / DL Configuration | | | 0 | 0 | 0 | 0 5 subframes / 5x DL transmissions by the TX ID indicated in the ID field |
| Multicast transmission | | | | 0 | | 0 not enabled |

Example illustration of cluster resource allocation and channel access message.

FIG.5

NETWORK CONTROLLED DEVICE TO DEVICE / MACHINE TO MACHINE CLUSTER OPERATION

BACKGROUND

Integration of new network topologies into a cellular network may provide a context for certain embodiments of the present invention. Heterogeneous networks in Long Term Evolution (LTE) of the 3$^{rd}$ Generation Partnership Project (3GPP) and LTE Advanced (LTE-A) exemplify such integration. Heterogeneous network can include, for example, a deployment of macros, micros, picos, femtos and relays in the same spectrum. One step further is to allow direct communication between devices operating in the cellular system when communicating devices are close to each other to use radio resources in the most efficient manner.

The device to device (D2D) concept has been discussed. Specifically, it has been discussed that a D2D cluster can exist, including a cluster head. Thus, for example, in a D2D integrated into cellular network, an evolved Node B (eNB) can allocate resources for the cluster, which the cluster head further allocates to cluster members.

Additionally, in dynamic resource allocation for D2D Communications, a network can arrange devices to the cluster and dynamically assign resources for them. Also cluster heads can be responsible to assigning subsets of resources to nearby devices in the same cluster. Other approaches include having the D2D devices negotiate transmission resources, for example, transmission (TX)/reception (RX) slot configurations.

SUMMARY

In certain embodiments, the present invention is a method. The method can include determining uplink resources to be granted to a cluster. The method can also include preparing, at an apparatus, an uplink resource grant, based on the determining, including a transmitter identifier. The method can further include transmitting the uplink resources grant to a plurality of cluster nodes of the cluster. The transmitter identifier can identify at least one node of the plurality of cluster nodes.

The present invention, in further embodiments, is a method. The method can include receiving, at an apparatus, an uplink grant that includes a transmitter identifier. The method can also include decoding the uplink grant to obtain the transmitter identifier. The method can further include checking the transmitter identifier to determine whether it corresponds to the apparatus. The method can additionally include acting based on the determination of whether the transmitter identifier corresponds to the apparatus.

In certain embodiments, the present invention is a computer-readable medium, such as a non-transitory computer-readable medium or a computer-readable storage medium, that is encoded with instructions that, when executed in hardware, perform a process. The process may be, for example, one of the above-described methods.

An apparatus can be the invention in certain additional embodiments. The apparatus can include at least one memory including computer program code. The apparatus can also include at least one processor. The at least one memory and the computer program code can be configured to, with the at least one processor, cause the apparatus at least to determine uplink resources to be granted to a cluster. The at least one memory and the computer program code can also configured to, with the at least one processor, cause the apparatus at least to prepare an uplink resource grant, based on the determining, including a transmitter identifier. The at least one memory and the computer program code can further be configured to, with the at least one processor, cause the apparatus at least to transmit the uplink resources grant to a plurality of cluster nodes of the cluster. The transmitter identifier can identify at least one node of the plurality of cluster nodes.

The present invention, according to certain further embodiments is an apparatus that can include at least one memory including computer program code and at least one processor. The at least one memory and the computer program code can be configured to, with the at least one processor, cause the apparatus at least to process, at an apparatus, a received uplink grant that includes a transmitter identifier. The at least one memory and the computer program code can also be configured to, with the at least one processor, cause the apparatus at least to decode the uplink grant to obtain the transmitter identifier. The at least one memory and the computer program code can further be configured to, with the at least one processor, cause the apparatus at least to check the transmitter identifier to determine whether it corresponds to the apparatus. The at least one memory and the computer program code can additionally be configured to, with the at least one processor, cause the apparatus at least to act based on the determination of whether the transmitter identifier corresponds to the apparatus.

BRIEF DESCRIPTION OF THE DRAWINGS

For proper understanding of the invention, reference should be made to the accompanying drawings, wherein:

FIG. 1 illustrates an example configuration of group identifiers (IDs) and transmitting device IDs with five bits.

FIG. 2 illustrates cluster resource allocation and a channel access procedure.

FIG. 3 illustrates dividing the allocated subframe between a control part and a data part.

FIG. 4 illustrates an example use case of group IDs in a device/machine cluster.

FIG. 5 illustrates, by way of example, a cluster resource allocation and channel access message.

DETAILED DESCRIPTION OF THE PREFERRED EMBODIMENT(S)

Figure 6:
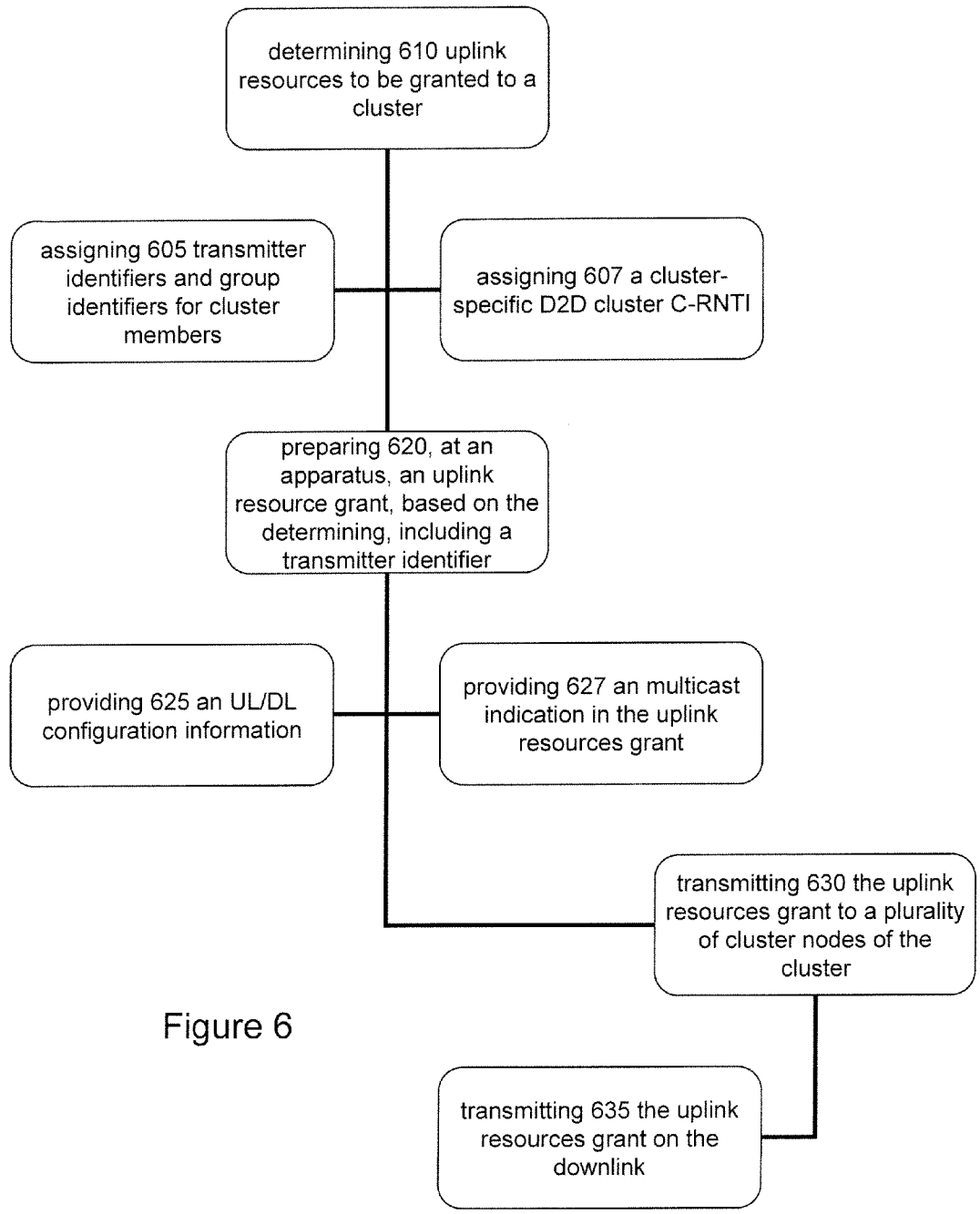
FIG. 6 illustrates a method according to certain embodiments of the present invention.

Certain embodiments of the present invention permit efficient cluster communication in the cellular network. Cluster communication refers to direct communication among devices or machines without routing the data through the network. In cluster communication, one device sends data to the other device in the cluster.

To alleviate the signaling overhead between devices and network (NW), or for other reasons, the direct communication capable devices close to each other with mutual interests can be grouped together. The devices in the group can share the resources among themselves. One way that they can share the resources is by competing for the allocated resources or having one of the devices further allocate the resources granted by the NW between cluster members. Acting as cluster head may require eNB-like features implemented to devices. Including such features can adds complexity to the device. In many situations these advanced features may not be needed or wanted due to the added complexity of the features. Cluster scheduling and channel access granting can, therefore, be handled by the network (NW) but the data traffic can be transmitted locally.

Thus certain embodiments provide a way to have cluster data transfer and a channel access solution in network-controlled D2D, permitting low user equipment (UE) complexity and low impact on current LTE signaling. More particularly, certain embodiments aim to provide an access scheme for very low complex direct communication capable devices and machines operating in the clusters without a cluster head. This is done by, for example, operating using new control signaling for cluster operation by reusing and reinterpreting existing LTE signaling mechanisms and messages.

When D2D is integrated into a cellular network, the cluster can operate on uplink (UL) resources. Thus, the uplink resource allocation grant can be reused for network controlled cluster operation as well. In addition to resource allocation, the UL resource grant can include information about the transmitting device, relieving the cluster from having to have a cluster head that further schedule resources among cluster members. Also contention based channel access mechanism is not required since the NW can control the access to granted resources. In this way, a simple access scheme can be used to first introduce the clusters to a cellular system that does not require any complex features to be implemented to devices operating as cluster members. In other words, there is no requirement in the cluster for a cluster head with eNB-like scheduling capabilities. The NW-controlled cluster operation can lower the threshold for adapting user cooperation schemes between D2D capable cellular users and can help to permit efficient data transfer between cluster members.

Certain embodiments of the present invention, therefore, include reinterpreting UL resource grant by assigning a cluster specific D2D cluster cell radio network identifier (C-RNTI) for each cluster. Certain embodiments also include transmitting device identifier (ID) using n bits and group ID using m bits. Furthermore, certain embodiments also include indicating the downlink/uplink (DL/UL) subframe configuration for the cluster by reinterpreting the cluster scheduling and channel access.

In one example embodiment, devices in the cluster can listen downlink physical control channel (DPCCH) for uplink resource allocations, which may be in the form of physical uplink shared channel (PUSCH) grant. When the PUSCH grant transmission is masked with D2D cluster C-RNTI, devices can re-interpret the fields in the message. If the PUSCH grant message is encoded with the device's own C-RNTI, the device can interpret the message normally. The D2D cluster C-RNTI can be indicated, for example, in the higher layer signaling message during cluster setup.

In one example embodiment, resources for the feedback signaling can be implicitly signaled by eNB in the DPCCH message, for example, in downlink control information (DCI) 0, or the eNB can assign dedicated control channels for the cluster. For example, the eNB can assign dedicated control channels for the cluster from the PUCCH region. This cluster feedback channel, which can be called a D2D control channel, can be mapped similarly to normal cellular PUCCH to PUCCH resources.

In one example embodiment, the uplink resource allocation message can contains following information: flag for format 0/format 1A differentiation (1 bit); frequency hopping flag (1 bit); resource block assignment (5-13 bits); modulation and coding scheme (MCS) and redundancy version (5 bits); new data indicator (1 bit); transmit power control (TPC) command for the scheduled PUSCH (2 bits); cyclic shift for demodulation reference signals (DM RS) (3 bits); uplink (UL) index for time division duplex (TDD) (2 bits); downlink (DL) assignment index (TDD) (2 bits); and channel quality indicator (CQI) request (1 bit).

Message length may vary due to the amount of bits used for assigning UL resource blocks but can be padded to match the size of message of a certain format. The number of bits used to assign UL resource blocks may depend, for example, on the bandwidth configuration. The uplink resource allocation message can now be reinterpreted by the cluster members when its cyclic redundancy check (CRC) is scrambled with D2D cluster C-RNTI. The reinterpreted fields may be, for example, MCS and redundancy version, new data indicator, UL index, DL assignment index, and CQI request. The reinterpreted fields are discussed in more detail below.

Fields known as the transmitting device identifier (ID) (n bits) and group ID (m bits) can be created. This field can reuse the MCS and redundancy version (5 bits) and new data indicator (1 bit). In one example, the first 5 bits of the (combined fields) 6 bit field can be interpreted as the transmitting device ID whereas the final bit can be the group ID. Each cluster member can have a specific ID which is given in the cluster setup phase. Then, the transmitting device ID field can indicate the cluster member that is allowed to transmit on the granted resource. All the other cluster members can set themselves to reception mode. The bit field can also be configured dynamically with higher layer signaling, for example, that only 2 bits are used to indicate who can transmit on the granted resource. As an example of a possible configuration, 2 bits are shown for a group ID and 3 bits are shown for the transmitting device ID in FIG. 1. The number of bits that indicate the transmitting device can be dynamically configured with higher layer signaling. Since the practical cluster sizes may be roughly less than ten, since the control overhead may become too large with higher member numbers, the 6 bit indicator can be divided between Transmitting Device ID and a group ID to have further control over the topology.

Furthermore, devices receiving the grant with the same D2D Cluster C-RNTI can know the transmitting device ID. This knowledge can permit possibilities for cluster management. Cluster members know which ID should be transmitting and when the transmission should come. Receiving cluster members can report bad or broken links to an eNB by themselves and the NW does not have to command regular link measurements in order to have the knowledge of cluster connectivity. Cluster members can also be configured to provide feedback directly to the eNB and to signal additional information for scheduling purposes, such as buffer status.

Indicating the DL/UL subframe configuration for cluster can be performed by reinterpreting the UL index (2 bits) and DL Assignment index (2 bits). By re-interpreting the index-fields, several DL/UL slot configurations (transmission and feedback) can be assigned to the cluster. For example, if the resource allocation grants the cluster five subframes in the scheduling message, the subframes can be configured in various ways with the available bits. Thus, four bits can provide sixteen different combinations, as illustrated in the following example:

| Bits | Configuration |
|---|---|
| 0000 | DL DL DL DL DL |
| 0001 | DL DL DL DL UL |
| 0010 | DL DL DL UL UL etc. |

Alternatively, the bits can be assigned differently. For example, two bits can be used for indicating the resource allocation in subframes and whether the allocation is semi-static (00=one subframe, 01=5 consecutive subframes etc.). Further the two bits can be used for different UL/DL configurations if several subframes are allocated.

The CQI request (1 bit) can optionally be reinterpreted to indicate multicast. This field can indicate that the D2D transmission has to be received also by the eNB. This may be useful in the scenario where few cluster members are located close to the transmitter but there are also distant members who wish to receive the transmission. The eNB can then further forward the transmission to the core network.

An example cluster resource allocation and channel access procedure is illustrated in FIG. 2. As shown in FIG. 2, the network can signal the transmitter IDs and group IDs for the cluster members and can assign a cluster-specific D2D cluster C-RNTI. The eNB can also include the transmitting device ID in the UL resource grant. Further, the devices in the cluster can decode the UL resource grants transmitted on the DL with D2D C-RNTI. When the UL grant transmitted with D2D C-RNTI is decoded correctly, the devices can reinterpret the fields and check the transmitting device ID, as well as the group ID, DL/UL configuration, and multicast bit, if configured.

A determination can be made by the device receiving the signal from the network as to whether the transmitting device ID and group ID in the grant are the same as the assigned cluster member ID. If so, the device can prepare a frame for transmission. If not, the device can switch to reception (RX) mode for the duration of recourse allocation. Additionally, if so configured, the device can listen on the D2D control channel for control information.

MCS information can be carried in a D2D control channel, in view of the fact that the MCS fields in the uplink resource allocation message have been reused for UE ID information. MCS selection based on D2D channel conditions may be done in the device rather than in the eNB. As illustrated in FIG. 3, the allocated subframe can be divided between control part (D2D control channel) and data part (D2D data channel). The D2D control information can also be transmitted on separate resources, and prior to the data transmission, if the allocated subframe is fully used for the D2D data transmission. The transmitting device can now decide the MCS for the next transmission and indicate it on the D2D control channel. When D2D control information is not transmitted, it may imply that the current D2D data transmission is similar to the previous D2D data transmission. Transmission type, for example, specific receiver address, may also be transmitted in the control part to indicate whether the transmission on data part is unicast/multicast or broadcast. This transmission type information can permit the clusters members to avoid processing the data part if the transmission is not directed to that device. In order to ensure the correct reception of the control part, the control part could be transmitted with lowest order modulation possible. This may require that the cluster has separate broadcast and multicast addresses in addition to the unicast addresses.

In this option, the MCS selection duty may be moved from the eNB to the cluster level. The eNB may have very limited knowledge about the link qualities compared to the actual cluster members during the cluster lifetime. An exception to this typical situation would be when the cluster members report the link qualities, but in some embodiments such reporting may be unnecessary overhead. In view of the typical situation where the eNB has very limited knowledge about the link qualities, it may be useful to have the transmitting device select the appropriate transmission format. Resource allocation for the cluster, as well as selecting the transmitting member, can be based on the scheduling requests made by the cluster members. Also, the cluster members can report the buffer status regularly to the eNB, which can then make scheduling decisions based on the traffic needs.

However, alternatively, MCS information carried on the D2D control channel may not be always needed. For example, if the MCS set is limited for the cluster transmission due to the similar radio links to the transmitting device in the cluster, the receiving devices can just do blind decoding, in as many iterations as necessary, according the pre-defined options. The approach can save the signaling cost from transmitting the D2D control information, while potentially imposing a small processing burden on the receiving devices. For example, machines that do not require more than a low data rate could have a fixed MCS that they use to transmit to each other or to some gateway. An example of such a situation may be when a mobile device acts as a gateway to a cellular network or a machine with cellular capabilities.

FIG. 4 illustrates an example usage of the group ID. FIG. 5 illustrates message that may be transmitted in a system such as that shown in FIG. 4. As shown in FIGS. 4-5, the NW can configure the devices in the three groups (groups A, B and C) under the same D2D Cluster C-RNTI. Each group can have four devices, group A having devices A.1, A.2, A.3 and A.4. All the members of the cluster can decode the UL resource allocation transmitted with D2D Cluster C-RNTI and can read the pre-configured group ID field and transmitter ID field. By using the transmitter ID field, the eNB can grant access to a single device in the group or, if needed, it can configure some transmitter ID to be 'ALL-TRANSMIT ID' to grant transmission turn to all devices in the group. This would enable e.g. devices A.1 A.2 A.3 A.4 to transmit same time on the same resource (resource reuse can be achieved by intelligently grouping the devices, e.g. static machines) with a single scheduling message.

FIG. 6 illustrates a method according to certain embodiments of the present invention. The method illustrated may be performed by an evolved Node B (enB), base station, or other access point. As illustrated in FIG. 6, a method can include determining 610 uplink resources to be granted to a cluster. The method can also include preparing 620, at an apparatus, an uplink resource grant, based on the determining, including a transmitter identifier. The method can further include transmitting 630 the uplink resources grant to a plurality of cluster nodes of the cluster. The transmitter identifier can identify at least one node of the plurality of cluster nodes.

The method of FIG. 6 can further include assigning 605 transmitter identifiers and group identifiers for cluster members. The method can additionally include assigning 607 a cluster-specific D2D cluster C-RNTI. The preparing 620 the uplink resource grant can include providing 625 an UL/DL configuration information. The preparing 620 the uplink resource grant can also include providing 627 a multicast indication in the uplink resources grant. The transmitting 630 the uplink resources grant can include transmitting 635 the uplink resources grant on the downlink.

Figure 7:
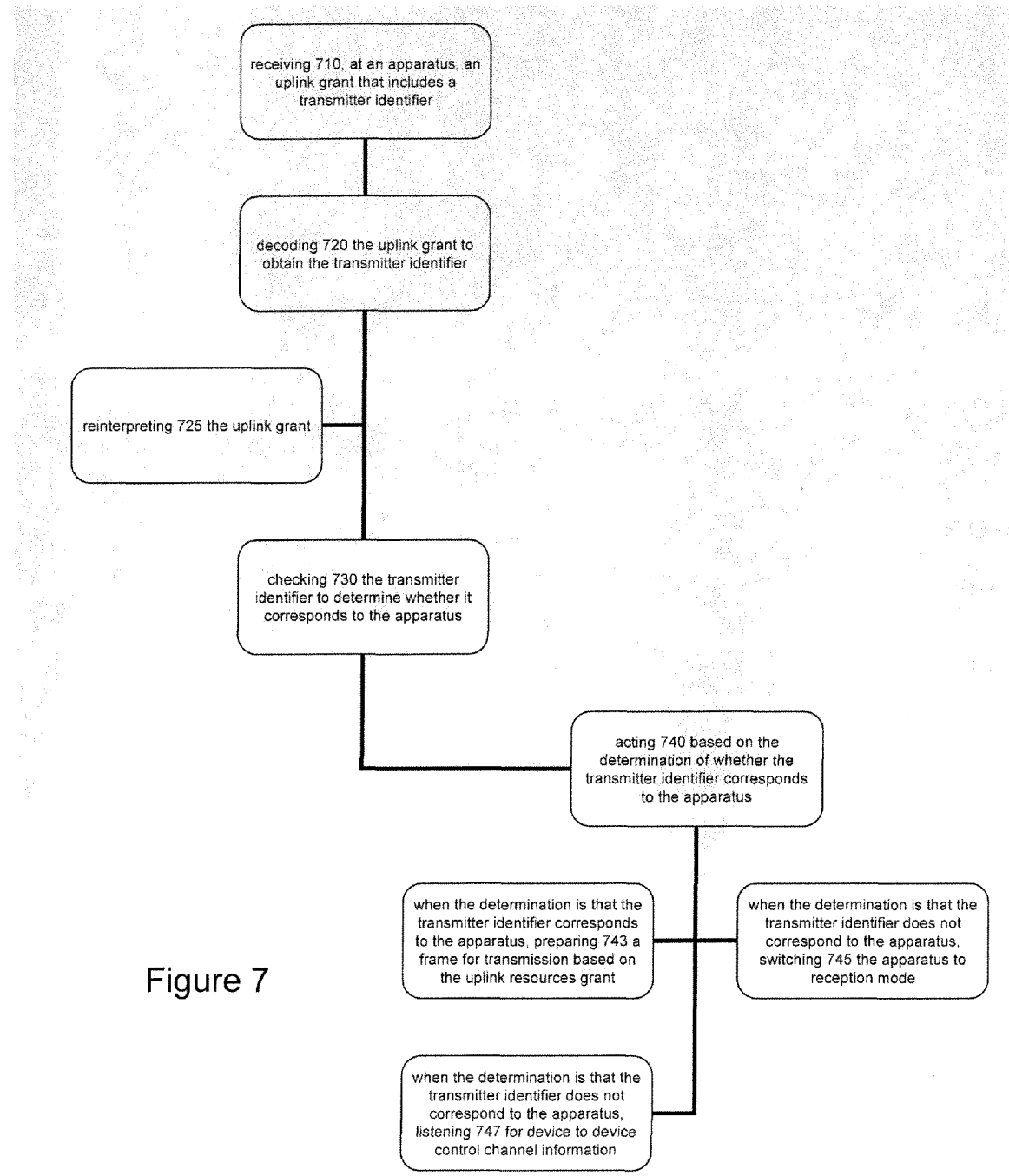
FIG. 7 illustrates a method according to further embodiments of the present invention.

FIG. 7 illustrates a method according to further embodiments of the present invention. The method illustrated may be performed by a user equipment (UE) that is equipped to perform device to device or machine to machine communication in an heterogeneous network. The method as illustrated in FIG. 6 can include receiving 710, at an apparatus, an uplink grant that includes a transmitter identifier. The method can also include decoding 720 the uplink grant to obtain the transmitter identifier. The method can further include checking 730 the transmitter identifier to determine whether it corresponds to the apparatus. The method can additionally include acting 740 based on the determination of whether the transmitter identifier corresponds to the apparatus.

The acting 740 based on the determination can include, when the determination is that the transmitter identifier corresponds to the apparatus, preparing 743 a frame for transmission based on the uplink resources grant.

The acting 740 based on the determination can include, when the determination is that the transmitter identifier does not correspond to the apparatus, switching 745 the apparatus to reception mode. The acting 740 based on the determination can further include, when the determination is that the transmitter identifier does not correspond to the apparatus, listening 747 for device to device control channel information.

The decoding 720 the uplink grant to obtain the transmitter identifier can include reinterpreting 725 the uplink grant.

Figure 8:
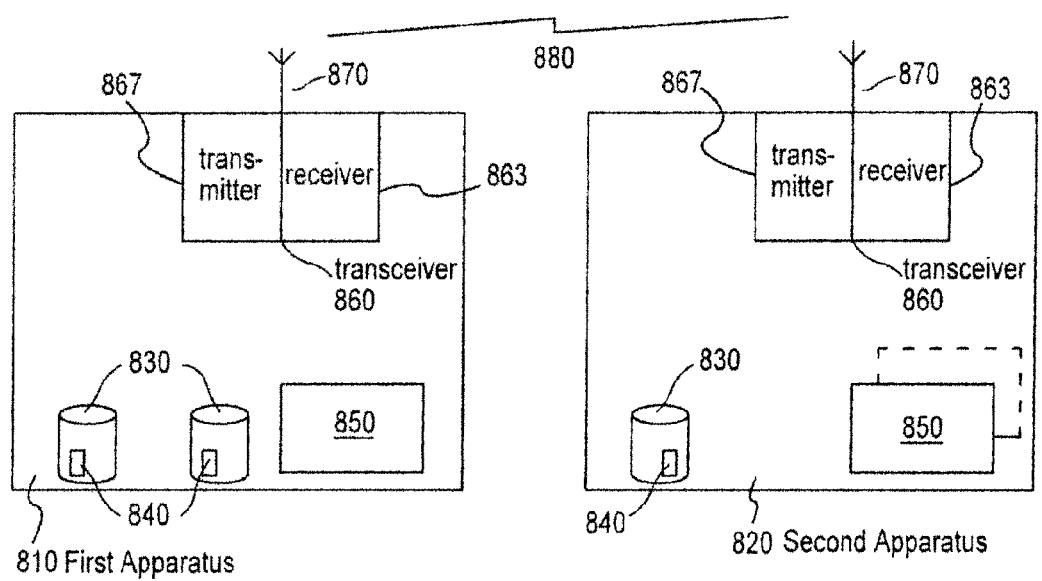
FIG. 8 illustrates a system according to certain embodiments of the present invention.

FIG. 8 illustrates a system according to an embodiment of the present invention. The system as illustrated in FIG. 8 can include a first apparatus 810 and a second apparatus 820. The first apparatus 810 may be, for example, an evolved Node B (eNB) or a base station. The second apparatus 820 may be, for example, a User Equipment (UE) that is equipped for device to device communication in an heterogeneous network.

The first apparatus 810 and the second apparatus 820 may each include at least one memory 830 including computer program code 840, as well as at least one processor 850. The memory 830 may be any suitable data storage device, such as random access memory (RAM) or read-only memory (ROM). The computer program code 840 may be any suitable computer instructions, such instructions that are compiled into a machine language or provided in an interpreted language. The at least one processor 850 may be any processing device, such as one or more controllers, a central processing unit (CPU), or an application specific integrated circuit (ASIC). The at least one memory 830 and the computer program code 840 can be configured to, with the at least one processor 850, cause the first apparatus 810 or second apparatus 820 to perform a process, such as the processes illustrated in FIG. 6-7.

The first apparatus 810 and the second apparatus 820 may further include a transceiver 860 that includes a receiver 863 and transmitter 867. The first apparatus 810 and the second apparatus 820 may each be configured to communicate using a respective antenna 870 over a wireless link 880.

In view of the above, certain embodiments of the present invention can use Long Term Evolution (LTE) signaling and channels. Only a limited number of fields may be reinterpreted, and this can be configured with higher layer signaling. Furthermore, certain embodiments provide a low complexity D2D channel access scheme for machines or devices operating in a cellular network. Furthermore, certain embodiments of the present invention enable the possibility for resource reuse that is coordinated by the network, and especially suitable for stationary machines or sensors.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
    assigning a cluster-specific device to device cluster cell radio network identifier to a cluster;
    determining uplink resources to be granted to a cluster;
    preparing, at an apparatus, an uplink resource grant for the cluster, based on the determining, by re-using an existing uplink resource grant message and apply the assigned cluster-specific device to device cluster cell radio network identifier, wherein the prepared uplink resource grant includes a transmitter identifier; and
    transmitting the uplink resources grant to a plurality of cluster nodes of the cluster, wherein the transmitter identifier identifies at least one node of the plurality of cluster nodes.

2. The method of claim 1, wherein the cluster comprises at least one group and each of the at least one group comprises at least one node, the method further comprising:
    assigning transmitter identifiers and group identifiers for cluster members.

3. The method of claim 1, wherein the preparing the uplink resource grant comprises replacing an existing field of the e existing uplink resource grant message by the transmitter identifier and a group identifier.

4. The method of claim 1, wherein the preparing the uplink resource grant comprises replacing an existing field of the existing uplink resource grant message by an uplink/downlink configuration information.

5. The method of claim 1, wherein the preparing the uplink resource grant comprises replacing an existing field of the existing uplink resource grant message by a multicast indication in the uplink resources grant.

6. An apparatus, comprising:
    at least one memory including computer program code; and
    at least one processor,
    wherein the at least one memory and the computer program code are configured to, with the at least one processor, cause the apparatus at least to
    assign a cluster-specific device to device cluster cell radio network identifier to a cluster;
    determine uplink resources to be granted to a cluster;
    prepare an uplink resource grant for the cluster, based on the determining, by re-using an existing uplink resource grant message and applying the assigned cluster-specific device to device cluster cell radio network identifier, wherein the prepared uplink resource grant includes a transmitter identifier; and
    transmit the uplink resources grant to a plurality of cluster nodes of the cluster, wherein the transmitter identifier identifies at least one node of the plurality of cluster nodes.

7. The apparatus of claim 6, wherein the cluster comprises at least one group and each of the at least one group comprises at least one node, wherein the at least one memory and the computer program code are also configured to, with the at least one processor, cause the apparatus at least to assign transmitter identifiers and group identifiers for cluster members.

8. The apparatus of claim 6, wherein the at least one memory and the computer program code are further configured to, with the at least one processor, cause the apparatus at least to prepare the uplink resource grant by replacing an existing field of the existing uplink resource grant message by the transmitter identifier and a group identifier.

9. The apparatus of claim 6, wherein the at least one memory and the computer program code are further configured to, with the at least one processor, cause the apparatus at least to replace an existing field of the existing uplink resource grant message by an uplink/downlink configuration information.

10. The apparatus of claim 6, wherein the at least one memory and the computer program code are further configured to, with the at least one processor, cause the apparatus at least to replace an existing field of the existing uplink resource grant message by a multicast indication in the uplink resources grant.

11. A method, comprising:
receiving, at an apparatus, a cluster-specific device to device cluster cell radio network identifier;
receiving an uplink resource grant message for a cluster;
decoding the uplink resource grant message by applying the received cluster-specific device to device cluster cell radio network identifier;
if the uplink resource grant message is successfully decoded, re-interpreting the received uplink resource grant message to obtain a transmitter identifier carried in the uplink resource grant message; and
checking the transmitter identifier to determine whether it corresponds to the apparatus.

12. The method of claim 11, wherein the cluster comprises at least one group and each of the at least one group comprises at least one node, the method further comprising:
re-interpreting the received uplink resource grant message to obtain a group identifier carried in the uplink resource grant message.

13. The method of claim 11, further comprising:
re-interpreting the received uplink resource grant message to obtain an uplink/downlink configuration information carried in the uplink resource grant message.

14. The method of claim 11, further comprising:
re-interpreting the received uplink resource grant message to obtain a multicast indication carried in the uplink resource grant message.

15. The method of claim 11, further comprising,
when the determination is that the transmitter identifier corresponds to the apparatus, preparing a frame for transmission based on the uplink resources grant, otherwise,
switching the apparatus to reception mode, or listening for device to device control channel information.

16. An apparatus, comprising:
at least one memory including computer program code; and
at least one processor,
wherein the at least one memory and the computer program code are configured to, with the at least one processor, cause the apparatus at least to
receive a cluster-specific device to device cluster cell radio network identifier;
receive an uplink resource grant message for a cluster;
decode the uplink resource grant message by applying the received cluster-specific device to device cluster cell radio network identifier;
if the uplink resource grant message is successfully decoded, re-interpret the received uplink resource grant message to obtain a transmitter identifier carried in the uplink resource grant message; and
check the transmitter identifier to determine whether it corresponds to the apparatus.

17. The apparatus of claim 16, wherein the cluster comprises at least one group and each of the at least one group comprises at least one node, and wherein the at least one memory and the computer program code are configured to, with the at least one processor, cause the apparatus at least to re-interpret the received uplink resource grant message to obtain a group identifier carried in the uplink resource grant message.

18. The apparatus of claim 16, wherein the at least one memory and the computer program code are configured to, with the at least one processor, cause the apparatus at least to re-interpret the received uplink resource grant message to obtain an uplink/downlink configuration information carried in the uplink resource grant message.

19. The apparatus of claim 16, wherein the at least one memory and the computer program code are configured to, with the at least one processor, cause the apparatus at least to re-interpret the received uplink resource grant message to obtain a multicast indication carried in the uplink resource grant message.

20. The apparatus of claim 16, wherein the at least one memory and the computer program code are configured to, with the at least one processor, cause the apparatus at least to, when the determination is that the transmitter identifier corresponds to the apparatus, prepare a frame for transmission based on the uplink resources grant, otherwise to switch the apparatus to reception mode or to listen for device to device control channel information.

* * * * *